US006603104B1

(12) United States Patent
Lee

(10) Patent No.: US 6,603,104 B1
(45) Date of Patent: Aug. 5, 2003

(54) APPARATUS FOR MAINTAINING AVERAGE SCREEN LIGHT LEVEL FOR FERROELECTRIC LIQUID CRYSTAL DISPLAY

(75) Inventor: Ho-seong Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 134 days.

(21) Appl. No.: 09/679,631

(22) Filed: Oct. 5, 2000

(30) Foreign Application Priority Data

Oct. 5, 1999 (KR) ........................................ 1999-42900

(51) Int. Cl.$^7$ .................................................. G01J 1/32

(52) U.S. Cl. ............ 250/205; 250/214 D; 250/214 AL; 345/63

(58) Field of Search ............................. 250/205, 201.1, 250/214 R, 214 D, 214 AL, 208.1; 345/11, 12, 63

(56) References Cited

U.S. PATENT DOCUMENTS 4,400,719 A * 8/1983 Powers ....................... 417/106
5,099,330 A 3/1992 Fuse et al. .................. 358/169
5,757,343 A * 5/1998 Nagakubo .................... 345/63
6,160,593 A * 12/2000 Nakakuki .................. 348/223

FOREIGN PATENT DOCUMENTS

EP 0 374 372 6/1990 ............ G09G/3/36
WO WO 97/33271 9/1997 ............ G09G/5/10

* cited by examiner

*Primary Examiner*—David V. Bruce
*Assistant Examiner*—Courtney Thomas
(74) *Attorney, Agent, or Firm*—Sughrue Mion, PLLC

(57) ABSTRACT

An apparatus for maintaining the average light level of a screen for a ferroelectric liquid crystal display (LCD) is provided. The apparatus for maintaining the average light level of a screen for a ferroelectric liquid crystal display (LCD), includes an average light level detector for detecting the average light level of an input signal, using a predetermined pixel value of the input signal, a system controller for providing a predetermined reference average light level, and a screen light adjuster for receiving a reference average light level provided by the average light level of the input signal output from the average light level detector and the reference average light level provided by the system controller, adjusting the light of a screen so that the difference between the average light level of the input signal and the reference average light level is reduced, and keeping the average light level of the screen uniform. According to the above apparatus, it is possible to keep the light of a screen uniform.

12 Claims, 6 Drawing Sheets

APPARATUS FOR MAINTAINING AVERAGE SCREEN LIGHT LEVEL FOR FERROELECTRIC LIQUID CRYSTAL DISPLAY

BACKGROUND OF THE INVENTION

1. Field of the Invention

The present invention relates to a ferroelectric liquid crystal display (LCD), and more particularly, to an apparatus for maintaining an average screen light level for a ferroelectric liquid crystal display.

2. Description of the Related Art

A ferroelectric LCD is a new type of LCD.

SUMMARY OF THE INVENTION

It is an object of the present invention to provide an apparatus for maintaining the average screen light level for a ferroelectric LCD by adjusting the average light level of an input signal using various methods so that the difference between the average light level of the input signal and a predetermined reference average light level is reduced.

Accordingly, to achieve the above object, there is provided an apparatus for maintaining the average light level of a screen for a ferroelectric liquid crystal display (LCD), comprising an average light level detector for detecting the average light level of an input signal, using a predetermined pixel value of the input signal, a system controller for providing a predetermined reference average light level, and a screen light adjuster for receiving a reference average light level provided by the average light level of the input signal output from the average light level detector and the reference average light level provided by the system controller, adjusting the light of a screen so that the difference between the average light level of the input signal and the reference average light level is reduced, and keeping the average light level of the screen uniform.

The system controller provides various reference average light levels corresponding to predetermined pixel values.

The average light level detector determines the average light level by summing the pixel values of the input signals contained in one frame, by summing arbitrary upper bits of each pixel of the input signals contained in one frame, by summing the input signals of one frame, selecting an arbitrary upper bit value from the result, and determining the selected upper bit value to be the average light level, by summing arbitrary upper bits of each line of the input signals contained in one frame, by summing pixel values of arbitrary regions of the input signals of one frame, or by selecting two or more steps among the steps of determining the average light level by summing all the pixel values of the input signals of one frame, determining the average light level by summing arbitrary upper bits of each pixel of the input signals contained in one frame, summing the input signals of one frame and determining the average light level by selecting arbitrary upper bits among the added result, determining the average light level by summing arbitrary upper bits each line of the input signals contained in one frame, and determining the average light level by summing pixel values in arbitrary regions of the input signals contained in one frame and combining the selected steps.

The screen light adjuster adjusts the contrast, the brightness, and the gamma value of the input signal or selects two or more steps among the steps of adjusting the contrast of the input signal, adjusting the brightness of the input signal, and adjusting the gamma value of the input signal and combines the selected steps.

BRIEF DESCRIPTION OF THE DRAWING(S)

The above object and advantages of the present invention will become more apparent by describing in detail a preferred embodiment thereof with reference to the attached drawings in which.

DESCRIPTION OF THE PREFERRED EMBODIMENT(S)

Figure 1A:
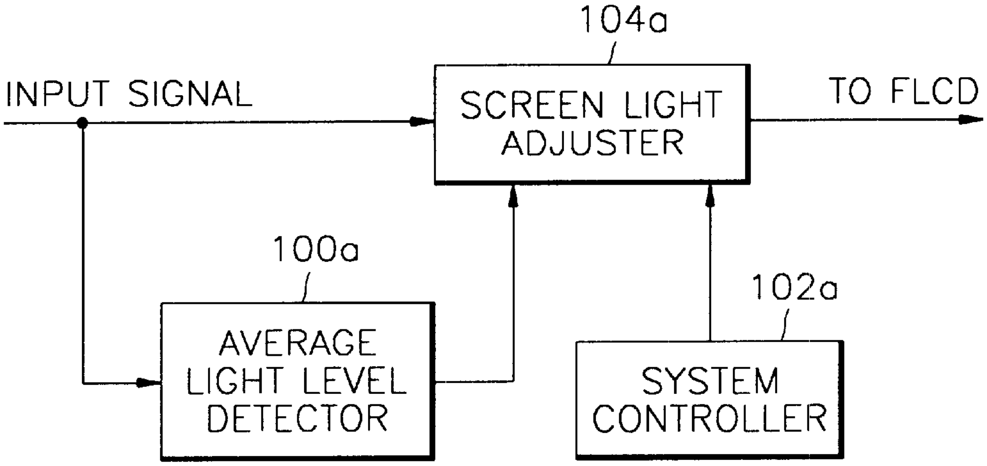
FIGS. 1A and 1B are block diagrams each of which shows the structure of an apparatus for maintaining the average screen light level for a ferroelectric liquid crystal display (LCD) according to a first embodiment of the present invention.
Figure 1B:
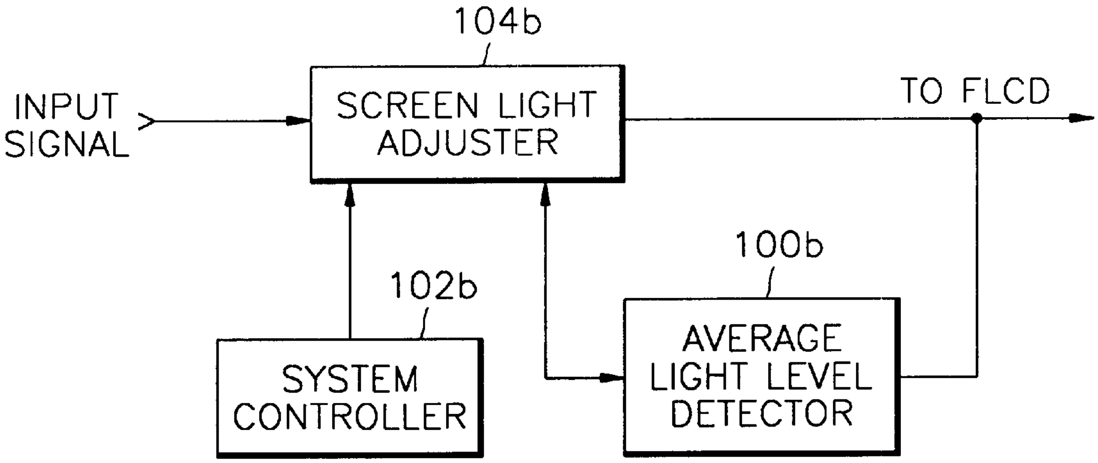

FIGS. 1A and 1B are block diagrams each of which shows the structure of an apparatus for maintaining the average screen light level for a ferroelectric liquid crystal display (LCD) according to a first embodiment of the present invention.

The apparatus shown in FIG. 1A or 1B consists of average light level detectors 100*a* and 100*b*, system controllers 102*a* and 102*b*, and screen light adjusters 104*a* and 104*b*.

The average light level detectors 100*a* and 100*b* detect the average light levels of input signals using predetermined pixel values of the input signals. The system controllers 102*a* and 102*b* provide predetermined reference average light levels.

The screen light adjusters 104*a* and 104*b* receive the average light levels of the input signals output from the average light level detectors 100*a* and 100*b* and the reference average light levels provided by the system controllers 102*a* and 102*b*, and control the light of the screen so that the difference between the average light levels of the input signals and the reference average light levels is reduced, thus maintaining the average light of the screen. In the present invention, the screen light level is adjusted by various methods to be described hereinafter. A method for adjusting the contrast of an input signal, a method for adjusting the brightness of an input signal, a method for correcting the gamma value of an input signal, and a method combining two or more of the above methods will now be described as a preferred embodiment.

The system controllers 102*a* and 102*b* output the optimal average screen light level designated by a system designer wherein how predetermined pixel values are used by the average light detectors 100*a* and 100*b* is previously estimated. In other words, the system controllers 102*a* and 102*b*, according to the present invention, provide various reference average light levels corresponding to the cases described by Equations 1 through 5.

First, the average light level detectors 100*a* and 100*b* detect a value obtained by adding all pixel values input signals carry in one frame to each other as an average light level. Here, if input image signals are referred to as X[i, j] with the x axis coordinate value as i, and the y axis coordinate value as j, the average light data (M) can be obtained by using Equation 1.

$$M = \sum_{j=0}^{ysize} \sum_{i=0}^{xsize} X[i, j] \tag{1}$$

The screen light adjusters 104*a* and 104*b* receive and compare the average light levels output from the average light level detectors 100*a* and 100*b* with the reference average light levels provided by the system controllers 102*a* and 102*b* and control the average screen light level with respect to input signals so that the difference between the average light levels of the input signals and the reference average light levels is reduced.

A method for adjusting the average light level of the input signals will now be described through various embodiments.

Other methods in which the average light level detectors 100*a* and 100*b* do not add all pixel values input signals carry in one frame to each other as in Equation 1 will be described with reference to Equations 2 through 5.

Second, the average light level detectors 100*a* and 100*b* detect a value obtained by adding arbitrary upper bits of each pixel input signals carry in one frame to each other as the average light level. Here, when the signal represented to be arbitrary upper bits (m) in all pixels of the input signals is referred to as MSB(X[i, j], m), the average light data (M) can be obtained by using Equation 2.

$$M = \sum_{j=0}^{ysize} \sum_{i=0}^{xsize} MSB(X[i, j], m) \tag{2}$$

Third, in case the average light level detectors 100*a* and 100*b* add the input signals of one frame to each other, selecting arbitrary upper bit values among the added results, thereby detecting the average upper bit value, the average light data (M) can be obtained by using Equation 3.

$$M = MSB \sum_{j=0}^{ysize} \sum_{i=0}^{xsize} (X[i, j], m) \tag{3}$$

Fourth, the average light level detectors 100*a* and 100*b* detect a value obtained by adding arbitrary upper bits of each line input signals carry in one frame to each other as the average light level. Here, the average light data can be obtained by using Equation 4.

$$M = MSB\left(\sum_{j=0}^{ysize} MSB\left(\sum_{i=0}^{xsize} (X[i, j], m1), m2\right)\right) \tag{4}$$

Fifth, the average light level detectors 100*a* and 100*b* detect a value obtained by adding pixel values in arbitrary regions input signals carry in one frame to each other as the average light level. Here, the average light data can be obtained by using Equation 5.

$$M = \sum_{j=y1}^{y2} \sum_{i=x1}^{x2} X[i, j] \tag{5}$$

Finally, the average light level detectors 100*a* and 100*b* can also detect the average light level by combining two or more of the preceding five steps.

Figure 2A:
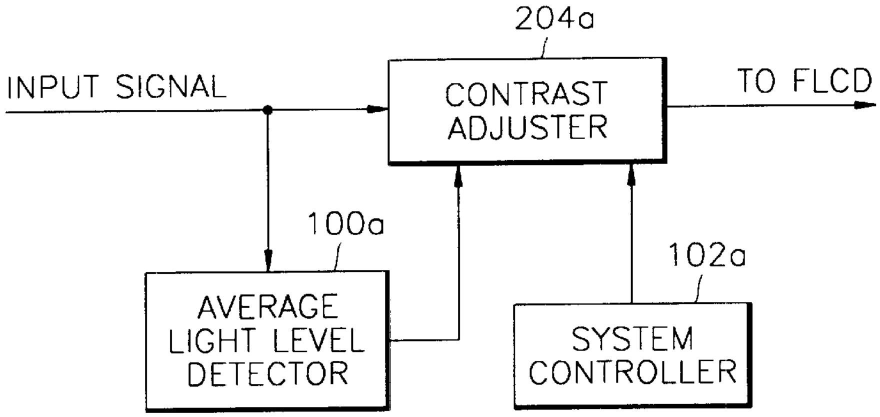
FIGS. 2A and 2B are block diagrams each of which shows the structure of the screen light adjusters of FIGS. 1A and 1B respectively according to a first embodiment.
Figure 2B:
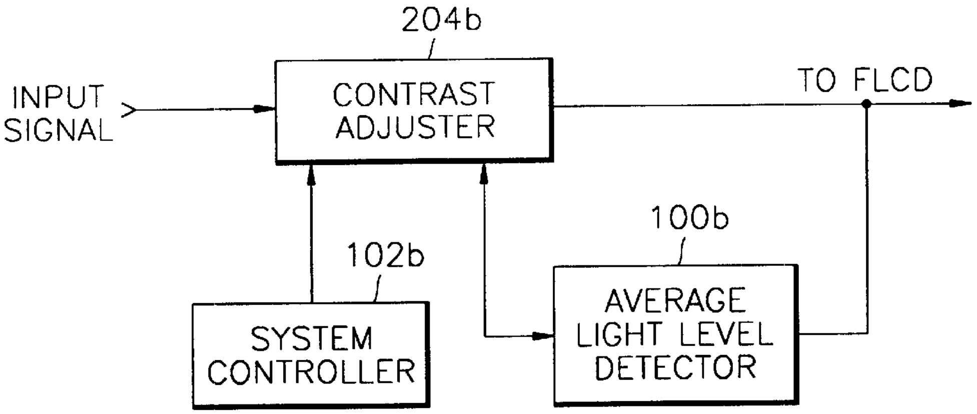

FIGS. 2A and 2B are block diagrams each of which shows the structure of the screen light adjuster of FIGS. 1A and 1B respectively according to a first embodiment, wherein the screen light level is adjusted by a contrast adjuster.

The apparatus shown in FIG. 2A or 2B includes average light level detectors 100*a* and 100*b*, system controllers 102*a* and 102*b*, and contrast adjusters 204*a* and 204*b*.

Figure 3:
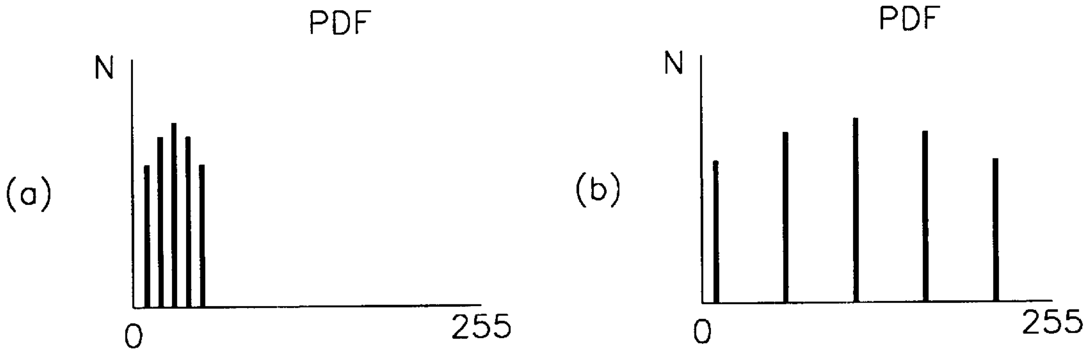
FIG. 3 shows the distribution of the average light level and the adjusted average light level of the input signal of FIG. 2.

FIG. 3A shows the distribution of the average light level of the input signal detected by the average light level detector 100*a*. When the input signal having the average light corresponding to the probability density function shown in FIG. 3A is input to the contrast adjuster 204*a*, the contrast adjuster 204*a* keeps the average light of the input signal uniform using a contrast adjustment control signal for reducing the difference between the reference average light level provided by the system controller 102*a* and the average light level of the input signal.

FIG. 3B shows the distribution of the average light of the input signal with its contrast adjusted. Assuming that the average light level of the input signal in the distribution shown in FIG. 3A is 10 and the reference average light level provided by the system controller 102*a* is 30, the contrast adjuster 204*a* keeps the average light level of the input signal uniform by increasing the contrast so that the average light level of the input signal becomes equal to the reference light level, which is 30.

Figure 4A:
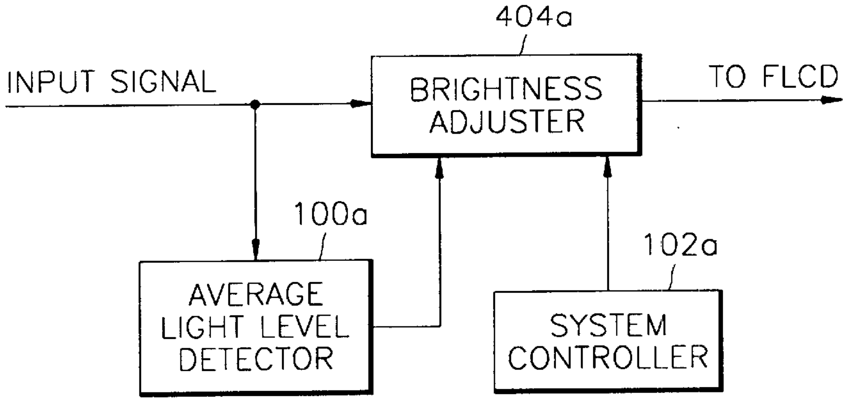
FIGS. 4A and 4B are block diagrams each of which shows the structure of the screen light adjusters of FIGS. 1A and 1B respectively according to a second embodiment.
Figure 4B:
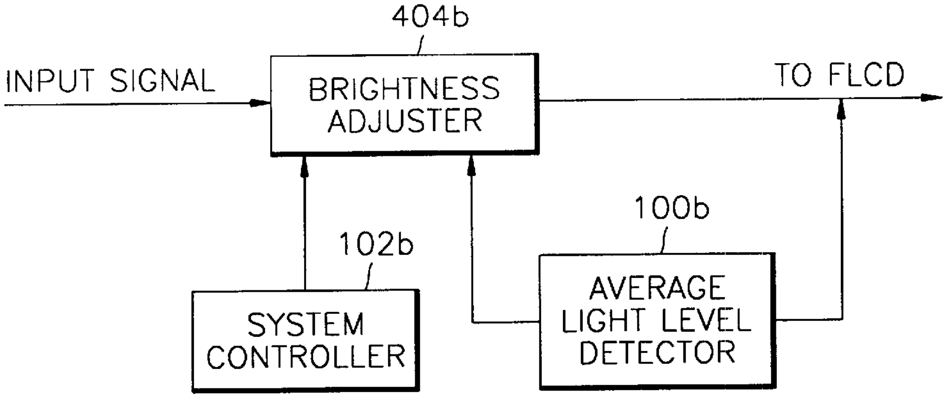

FIGS. 4A and 4B are block diagrams each of which shows the structure of the screen light adjuster of FIGS. 1A and 1B respectively according to a second embodiment, in which the average light of the screen is corrected by adjusting a brightness level. The apparatus shown in FIG. 4A or 4B includes average light level detectors 100*a* and 100*b*, system controllers 102*a* and 102*b*, and brightness adjusters 404*a* and 404*b*.

Figure 5:
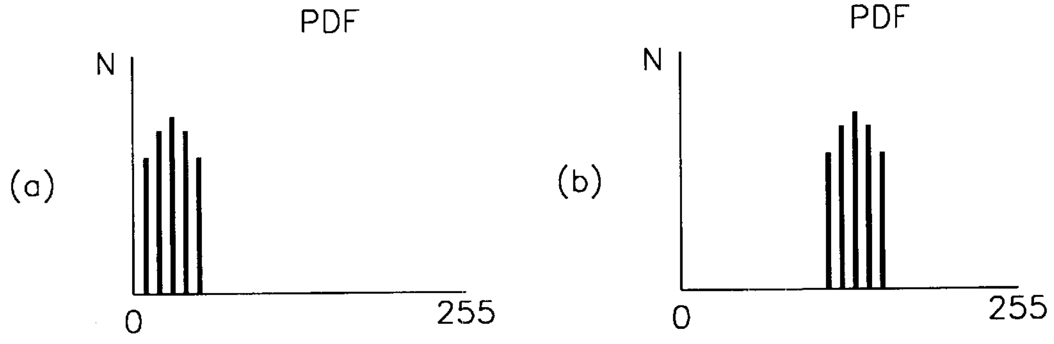
FIG. 5 shows the distribution of the average light level and the adjusted average light level of the input signal of FIGS. 4A and 4B.

FIG. 5A shows the distribution of the average light of the input signal detected by the average light level detector 100*b*. When the input signal having the average light level corresponding to the probability density function shown in FIG. 5A is input to the brightness adjuster 404*b*, the brightness adjuster 404*b* keeps the average brightness of the input signal uniform by utilizing a brightness adjustment control signal for reducing the difference between the reference average light level provided by the system controller 102*b* and the average light level of the input signal.

FIG. 5B shows the distribution of the average light of the input signal with its brightness adjusted. Assuming that the average light level of the input signal in the distribution shown in FIG. 5A is 10 and the reference average light level provided by the system controller 102*b* is 30, the brightness adjuster 404*b* keeps the average light level of the input signal uniform by increasing the brightness level so that the average light level of the input signal becomes equal to the reference light level, which is 30.

Figure 6A:
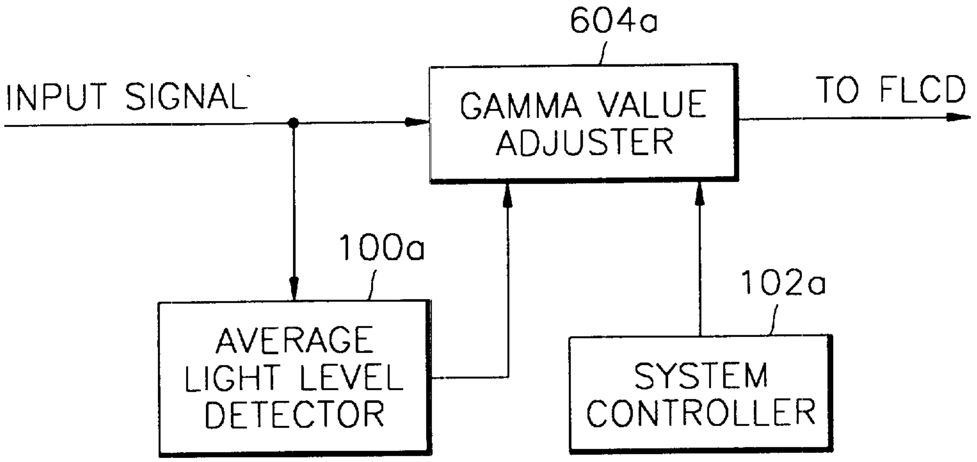
FIGS. 6A and 6B are block diagrams each of which shows the structure of the screen light adjuster of FIGS. 1A and 1B respectively according to a third embodiment.
Figure 6B:
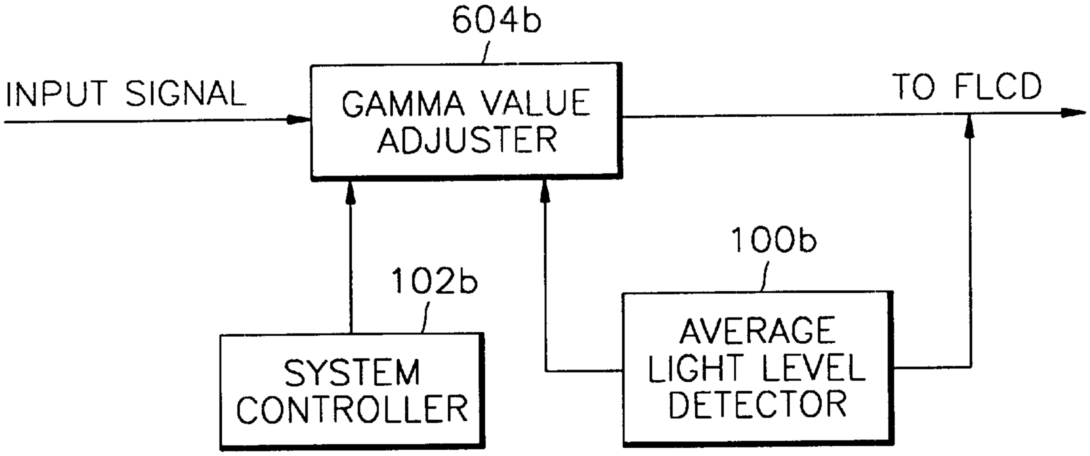

FIGS. 6A and 6B are block diagrams each of which shows the structure of the screen light adjuster of FIGS. 1A and 1B respectively according to a third embodiment wherein the average light of the screen is corrected by adjusting a gamma value. The apparatus shown in FIG. 6A or 6B includes average light level detectors 100*a* and 100*b*, system controllers 102*a* and 102*b*, and gamma value adjusters 604*a* and 604*b*.

Figure 7:
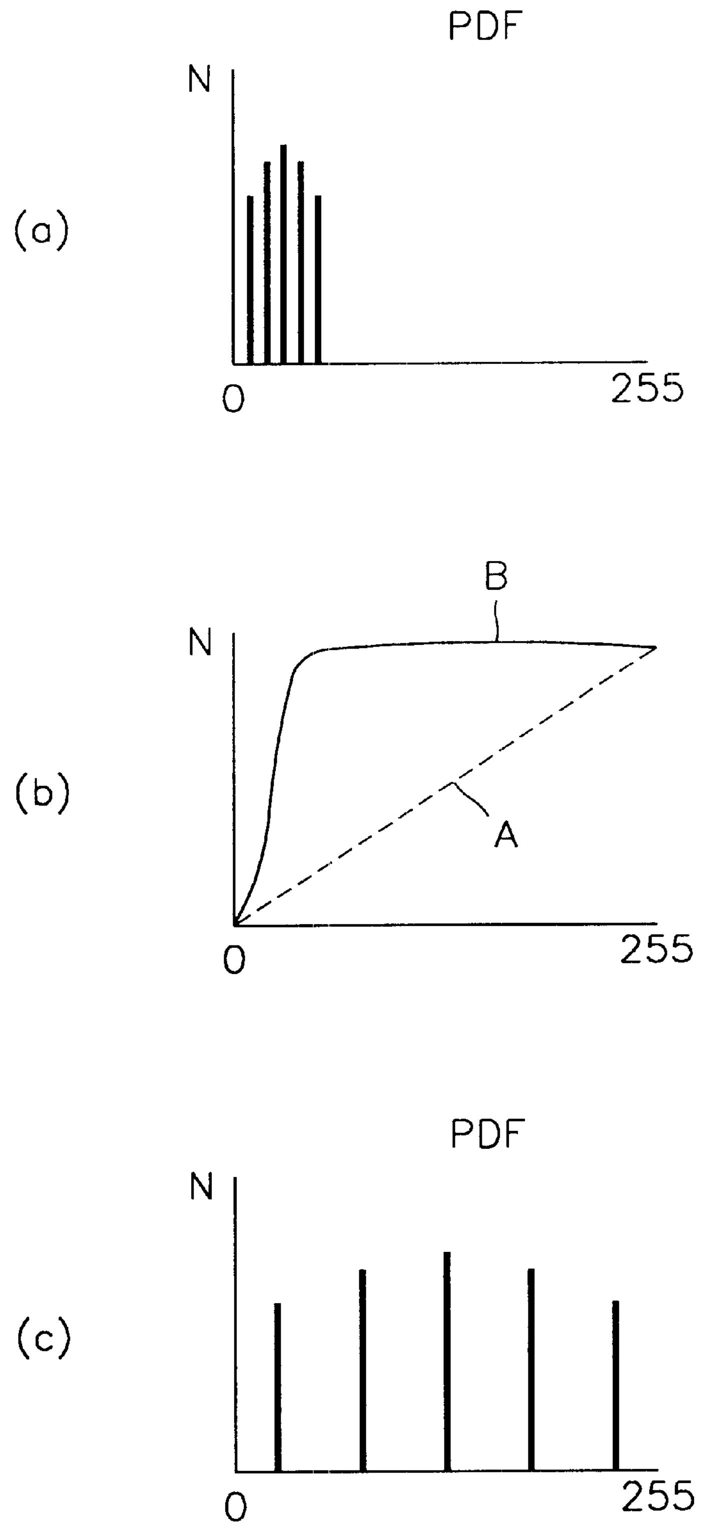
FIG. 7 shows the distribution of the average light level and the adjusted average light level of the input signal of FIGS. 6A and 6B.

FIG. 7A shows the distribution of the average light level of the input signal detected by the average light level detector 100*a*. FIG. 7B shows a gamma curve. The dotted line A in FIG. 7B shows the gamma value of the distribution shown in FIG. 7A. When the input signal having the average light level corresponding to the probability density function shown in FIG. 7A is input to the gamma value adjuster 604*a*, the gamma value adjuster 604*a* keeps the average light of the input signal having the distribution shown in FIG. 7C uniform with the use of a gamma value adjustment control signal for reducing the difference between the reference average light level provided by the system controller 102*a* and the average light level of the input signal, consequently creating the gamma curve shown in FIG. 7B.

Figure 8A:
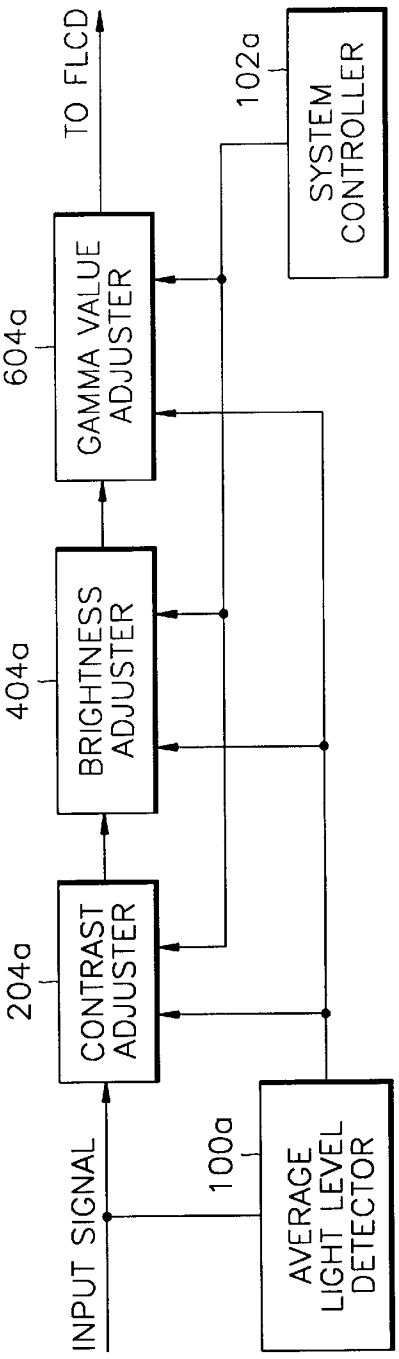
FIGS. 8A and 8B are block diagrams each of which shows the structure of the screen light adjusters of FIGS. 1A and 1B according to a fourth embodiment.
Figure 8B:
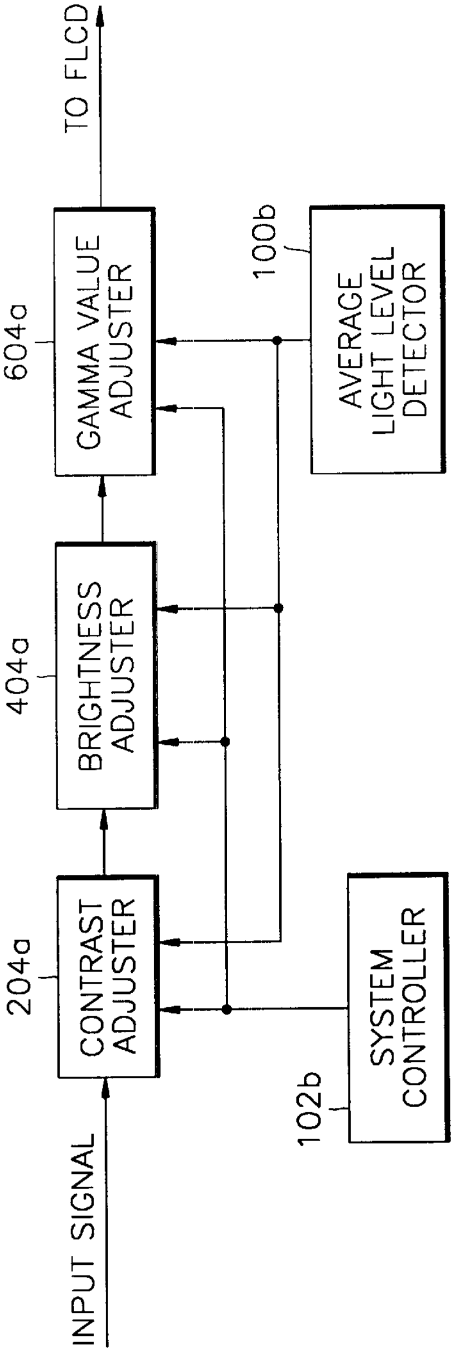

FIGS. 8A and 8B are block diagrams each of which shows the structure of the screen light adjuster of FIGS. 1A and 1B according to a fourth embodiment. Here, the average light of the screen is adjusted by implementing two or more blocks among the contrast adjusters 204*a* and 204*b* for adjusting the contrast of the input signal, the brightness adjusters 404*a* and 404*b* for adjusting the brightness of the input signal, and the gamma value adjusters 604*a* and 604*b* for adjusting the gamma value of the input signal, thereby combining the selected blocks together.

In the cases described above, the input screen light level is adjusted so as to reduce the difference between the average light levels detected from the input signals and the reference average light levels provided by the system controllers 102*a* and 102*b*.

Conclusively, it is possible to control the screen light level by reducing the difference between the average screen light level detected from the input signal and the reference average light level, thereby keeping the screen light level uniform. Accordingly, the present invention can provide comfortable operating circumstances to a user.

What is claimed is:

1. An apparatus for maintaining an average light level of a screen for a ferroelectric liquid crystal display (LCD), the apparatus comprising:

an average light level detector for detecting an average light level of an input signal based on a predetermined pixel value of the input signal;

a system controller for providing a predetermined reference average light level; and a screen light adjuster for receiving the average light level of the input signal output from the average light level detector and the reference average light level provided by the system controller, adjusting a light level of a screen of the liquid crystal display so that the average light level of the screen becomes substantially equal to the reference average light level thereby to cause the average light level of the screen to not vary from frame-to-frame.

2. The apparatus of claim 1, wherein the system controller provides reference average light levels corresponding to predetermined pixel values.

3. The apparatus of claim 1, wherein the average light level detector determines the average light level by summing the pixel values contained in a frame of the input signal.

4. The apparatus of claim 1, wherein the average light level detector determines the average light level by summing arbitrary upper bits of each pixel contained in a frame of the input signal.

5. The apparatus of claim 1, wherein the average light level detector performs at least two operations among the operations of determining the average light level by summing all the pixel values of of one frame the input signal, determining the average light level by summing arbitrary upper bits of each pixel contained in one frame of the input signal, summing the input signal of one frame and determining the average light level by selecting arbitrary upper bits among the added result, determining the average light level by summing arbitrary upper bits each line contained in one frame of the input signal, and determining the average light level by summing pixel values in arbitrary regions contained in one frame of the input signal.

6. The apparatus of claim 1, wherein the screen light adjuster adjusts a contrast of the input signal.

7. The apparatus of claim 1, wherein the screen light adjuster adjusts a brightness of the input signal.

8. The apparatus of claim 1, wherein the screen light adjuster adjusts a gamma value of the input signal.

9. The apparatus of claim 1, wherein the screen light adjuster performs at least two operations among the operations of adjusting a contrast of the input signal, adjusting a brightness of the input signal, and adjusting a gamma value of the input signal.

10. An apparatus for maintaining an average light level of a screen for a ferroelectric liquid crystal display (LCD), the apparatus comprising:

an average light level detector for detecting an average light level of an input signal based on a predetermined pixel value of the input signal;

a system controller for providing a predetermined reference average light level; and a screen light adjuster for receiving the average light level of the input signal output from the average light level detector and the reference average light level provided by the system controller, adjusting a light level of the screen so that the average light level of the screen becomes substantially equal to the reference average light level thereby to cause the average light level of the screen to not vary from frame-to-frame;

wherein the average light level detector sums a frame of the input signal, selects an arbitrary upper bit value from the summation result, and determines the selected upper bit value to be the average light level.

11. An apparatus for maintaining an average light level of a screen for a ferroelectric liquid crystal display (LCD), the apparatus comprising:

an average light level detector for detecting an average light level of an input signal based on a predetermined pixel value of the input signal;

a system controller for providing a predetermined reference average light level; and a screen light adjuster for receiving the average light level of the input signal output from the average light level detector and the reference average light level provided by the system controller, adjusting a light level of the screen so that the average light level of the screen becomes substantially equal to the reference average light level thereby to cause the average light level of the screen to not vary from frame-to-frame;

wherein the average light level detector determines the average light level by summing arbitrary upper bits of each line contained in a frame of the input signal.

12. An apparatus for maintaining an average light level of a screen for a ferroelectric liquid crystal display (LCD), the apparatus comprising:

an average light level detector for detecting an average light level of an input signal based on a predetermined pixel value of the input signal;

a system controller for providing a predetermined reference average light level; and a screen light adjuster for receiving the average light level of the input signal output from the average light level detector and the reference average light level provided by the system controller, adjusting a light level of the screen so that the average light level of the screen becomes substantially equal to the reference average light level thereby to cause the average light level of the screen to not vary from frame-to-frame;

wherein the average light level detector determines the average light level by summing pixel values of arbitrary regions of one frame of the input signal.

* * * * *